United States Patent [19]
Roch

[11] 3,942,400
[45] Mar. 9, 1976

[54] SHEAR MOUNTING FOR CORNER SHEARING MACHINE

[75] Inventor: Gerald V. Roch, Indianapolis, Ind.

[73] Assignee: Hurco Manufacturing Company Inc., Indianapolis, Ind.

[22] Filed: May 13, 1974

[21] Appl. No.: 469,434

Related U.S. Application Data

[62] Division of Ser. No. 280,248, Aug. 14, 1972, Pat. No. 3,828,639.

[52] U.S. Cl. .......... 83/13; 83/582; 83/622; 83/635; 83/699; 308/3 A
[51] Int. Cl.² .......... B26D 1/06; B26D 5/08
[58] Field of Search .......... 83/699, 698, 700, 635, 83/582, 620, 622, 693, 917, 13; 308/3 R, 3.9, 3 A

[56] References Cited
UNITED STATES PATENTS

| | | | |
|---|---|---|---|
| 2,645,287 | 7/1953 | Munschauer | 83/635 |
| 2,781,844 | 2/1957 | Pearson et al. | 83/635 X |
| 3,183,756 | 5/1965 | Dehn | 83/635 X |
| 3,205,748 | 9/1965 | Smeets | 83/700 X |
| 3,242,786 | 3/1966 | Giordano | 83/635 X |
| 3,371,569 | 3/1968 | Pearson et al. | 83/582 |
| 3,405,583 | 10/1968 | Herzog | 83/635 X |
| 3,616,719 | 11/1971 | Tassie | 83/917 X |

Primary Examiner—Travis S. McGehee
Assistant Examiner—W. D. Bray
Attorney, Agent, or Firm—Woodard, Weikart, Emhardt & Naughton

[57] ABSTRACT

A corner shearing machine has two pairs of shears, the lower blade of one pair intersecting the lower blade of another at a right angle, and the upper blade of one pair intersecting the upper blade of the other pair at a right angle, the lower blades being mounted to a base and the upper blades to a reciprocable ram. Adjusting wedge assemblies, with screw drives and manually operable cranks facilitate adjustment of blade clearance, and hydraulically energized pressure pads maintain zero clearance between ram guide slides and guideway blocks therefor. Ram drive is by one or another of two hydraulic cylinders operating through a rocker shaft and linkage connected to the ram, and hydraulic clamps secure the work.

3 Claims, 13 Drawing Figures

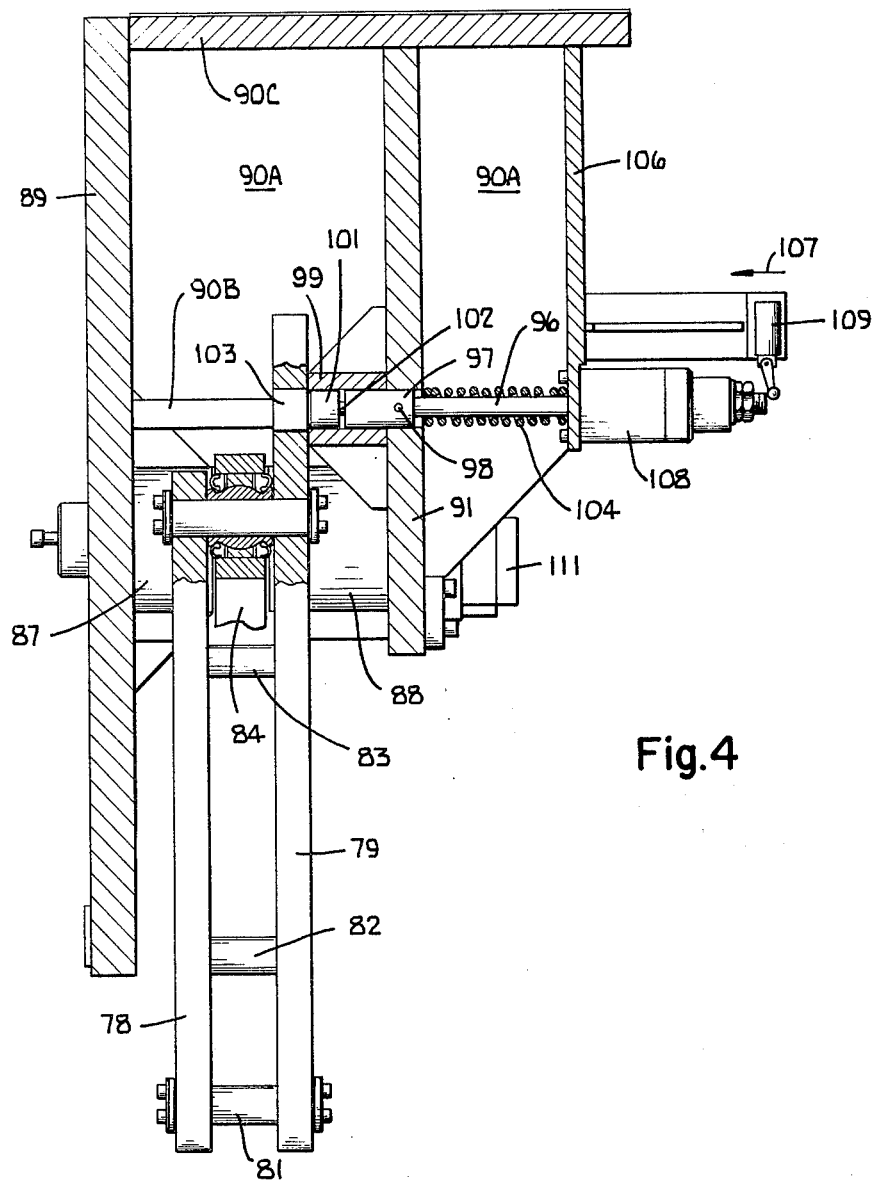
Fig.4
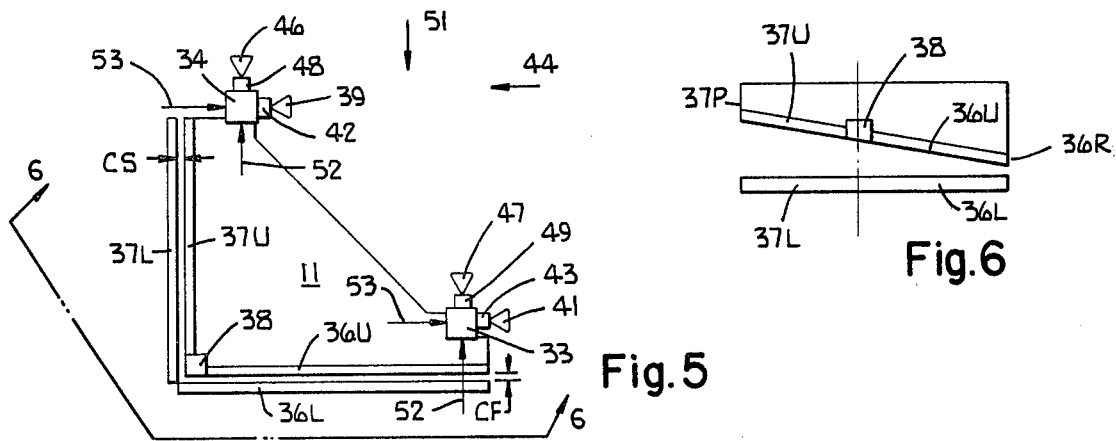
Fig.5
Fig.6

SHEAR MOUNTING FOR CORNER SHEARING MACHINE

BACKGROUND OF THE INVENTION

This is a division of application Ser. No. 280,248, filed Aug. 14, 1972 now U.S. Pat. No. 3,828,639.

FIELD OF THE INVENTION

This invention relates generally to shearing machines, and more particularly to a corner shearing machine, such as shown and described in my co-pending application Ser. No. 42,047, filed June 1, 1970, now U.S. Pat. No. 3,691,887 entitled AUTOMATIC SHEARING METHOD AND APPARATUS.

As it becomes desirable to shear greater thicknesses or larger sheets of tougher materials, the loads on shear blades become higher. For long blade life and good shearing performance, it is my opinion that selection and/or control of blade clearance is important. The present invention is directed toward convenience and reliability in establishing, selecting, and maintaining desired blade clearances.

SUMMARY OF THE INVENTION

Described briefly, in a typical embodiment of the present invention a corner shearing machine is provided with two pairs of shears and means for adjusting the clearance between the upper and lower blades of the one pair when the blades are closed, and for adjusting the clearance between the upper and lower blades of the other pair when the blades are closed, and facilitating such adjustment. Means are also provided to establish and maintain zero clearance between the guide slides secured to the moving blade, and the guideway secured to the base, to avoid changes in blade clearance with changes of blade loading. Full or half-stroke blade drive is provided by energization of alternate drive means therefor.

Brief Description of the Drawings

FIG. 4 is a top plan view of a portion of the assembly of FIGS. 2 and 3 and on the same scale as FIG. 3 and partially sectioned to show details of the ram lock and of the swivel bearings.

FIG. 5 is a schematic top plan view of the ram assembly and adjustment means therefor.

FIG. 6 is a schematic corner view as taken at line 6—6 in FIG. 5 and viewed in the direction of the arrows.

DESCRIPTION OF THE PREFERRED EMBODIMENT

Figure 1:
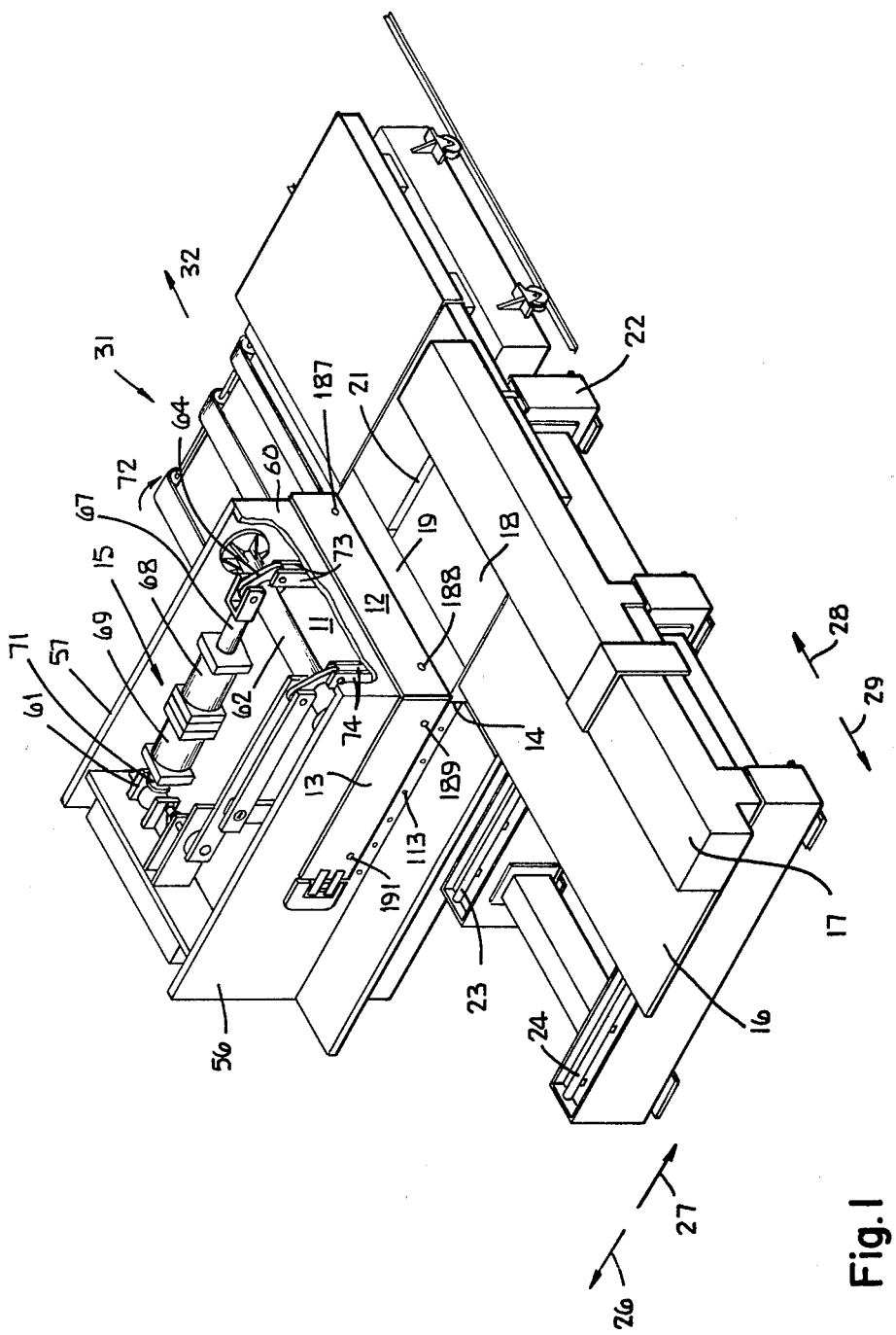
FIG. 1 is a perspective view of a corner shearing machine incorporating a typical embodiment of the present invention.

Referring now to the drawing in detail, and more particularly to FIG. 1, the machine includes a vertically reciprocable ram 11 which mounts upper front and side blades (not shown in FIG. 1) behind the front cover plate 12 and left side cover plate 13, respectively, and meeting in a corner. These blades are disposed above lower blades, likewise meeting in a corner behind the corner 14. These features are shown schematically in FIGS. 5 and 6 and described in more detail hereinafter. The ram is operable by cylinder means 16 to drive the upper blades in shearing relation with the lower blades.

The stock to be sheared is mounted on a "Y-axis" table top 16 and is gripped by a set of grippers mounted on an "X-axis" carriage inside the housing 17. A stationary table top 18 is provided immediately in front of a stationary cover plate 19 immediately in front of the lower front blade. This stationary top is slotted at 21 to accommodate an upstanding support from a bearing assembly mounted on a Y-axis guide rod in housing 22 similar to Y-axis guide rods 23 and 24 in their respective housings, all of which support bearings supporting a Y-axis carriage to which the table top 16 and housing 17 are affixed for movement toward the blades in the direction of arrow 26 and movement away from the blades in direction of arrow 27. Similarly, appropriate guide rods are provided in housing 17 supporting the X-axis carriage for movement of the grippers toward the blades in the direction of arrow 28 and away from the blades in the direction of arrow 29. A conveyor assembly is provided at 31 to remove sheared corner blanks from below the ram 11 in the direction of arrow 32. This general type of shearing machine construction is shown and described in detail in my aforementioned co-pending patent application. The primary interest in the present application is the mounting, adjustment, and drive for the blades.

An understanding of the concepts involved might be more quickly appreciated upon consideration of FIGS. 5 and 6. FIG. 5 shows a ram 11 having affixed thereto adjacent the right-hand front corner a front slide guide block 33 projecting upwardly therefrom. Adjacent the left rear corner of the ram is another block which will be referred to as the side guide slide block 34. The upper front blade affixed to the ram is designated schematically at 36U and the lower front blade affixed to the base is designated schematically at 36L. The upper side blade affixed to the ram is designated 37U and the lower side blade is designated 37L. For extra durability, a corner block 38 is provided at the corner and serves as an extension of the blades 36U and 37U to the corner. A similar type of construction can be provided at the junction of the lower blades, if desired.

The blade clearance between the front blades is designated by the dimension CF and the clearance between the side blades is designated by the dimension CS. This is the clearance measured perpendicular to the gauge faces when the blades are closed by the shear ram being down.

To adjust the side clearance, there are screw operated wedges 39 and 41 bearing against wedges 42 and 43, respectively, which engage the right-hand side faces of the side and front guide slide blocks 34 and 33, respectively. Adjustment of the screw driven wedges 39 and 41 is effective to drive the ram assembly sideways to the left in the direction of arrow 44 and reduce the side blade clearance CS.

Screw operated wedges 46 and 47 engage wedges 48 and 49 respectively which engage the rear faces of the side and front guide slide blocks, respectively. Operation of these wedges is effective to drive the ram forward in the direction of arrow 51 to reduce the front blade clearance CF.

To maintain zero clearance between the wedges and the slide blocks, force is applied in a rearward direction opposite arrow 51 as indicated by the arrows pointing to each of the slide blocks, and also force is applied to the right opposite the direction of arrow 44 and in the direction of the arrows 53 pointing to the slide blocks. The means by which this is accomplished will be described hereinafter. In the interim, while still referring to the schematic diagram of FIG. 5, reference should be made to FIG. 6 which shows that the upper edges of the lower blades are in a horizontal plane, while the lower edges of the upper blades are disposed at an angle. This feature is described in the aforementioned patent application and provides a rake beginning with the right-hand corner 36R of the upper blade 36U and continuing through the rear corner 37P of the side blade 37U. The amount of this rake is approximately 150 thousandths of an inch per foot of length of the blade. Typically the overall length of the front blade is 66 inches, and the overall length of the side blade is 48 inches, the blades being one inch thick and three inches high.

Figure 2:
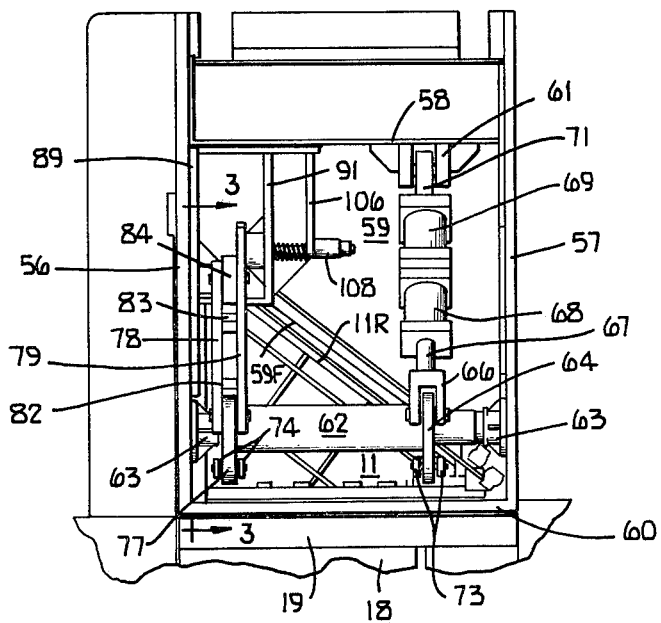
FIG. 2 is a top plan view on a somewhat larger scale than FIG. 1 and showing the portion thereof enclosing the blade and drive assembly and adjustment apparatus.
Figure 3:
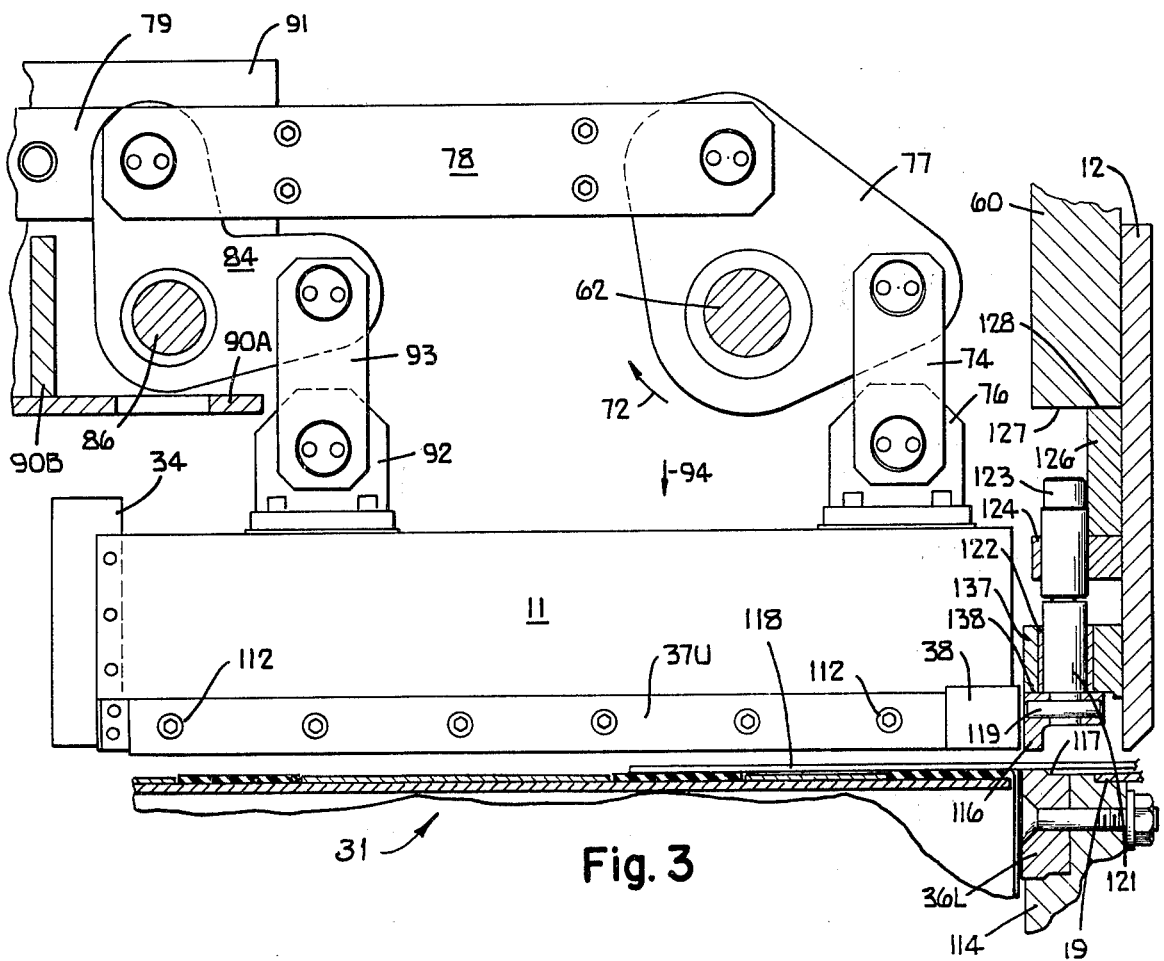
FIG. 3 is a further enlarged side section taken at line 3—3 in FIG. 2 and viewed in the direction of the arrows, and illustrating the left-hand side of the ram frame, upper side blade drive cranks and links.
Figure 7:
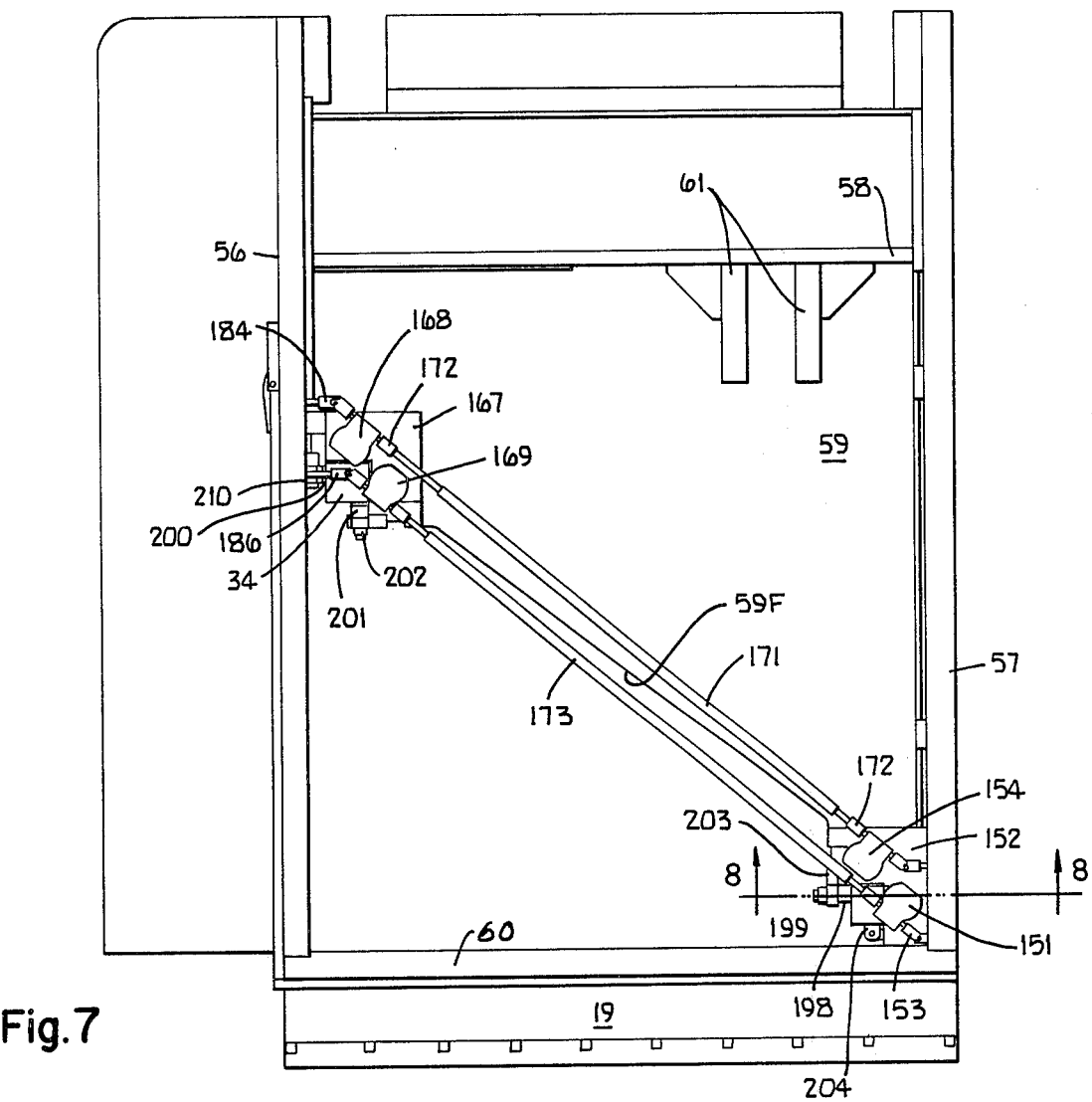
FIG. 7 is a top plan view on a scale larger than FIG. 2 and smaller than FIG. 4 and omitting the upper blade mounting ram and rocker shaft and linkage therefor.

Referring again to FIGS. 1, 2 and 7, a structure which may be referred to as the ram housing includes a weldment including a left side 56, right side 57, rear cross member 58 and center support 59, and ram drive cylinder rear mounting bracket 61. A drive crankshaft (tube) has its opposite ends mounted to the left and right side of the ram housing through crank bearing assemblies 63 secured to the sides 56 and 57. The main drive crank 64 affixed to the crankshaft 62 has a swivel bearing therein receiving a pin connecting the crank clevis 66 thereto, this clevis being connected to the end of the piston rod 67 of hydraulic cylinder 68. Another hydraulic cylinder 69 is secured to cylinder 68 in an end-to-end arrangement, and the piston rod thereof 71 is pinned to bracket 61. Extension of the piston rod of either of these cylinders serves to rock the crankshaft forward in the direction of arrow 72 to drive the ram 11 downward. For this purpose a pair of links 73 is pinned to the crank 64 and to a bracket affixed to the ram frame 11. Similarly another pair of links 74 is pinned to a bracket 76 (FIG. 3) affixed to the top of the ram frame 11, the upper ends of these links being pinned to a crank 77 affixed to the crankshaft 62. Crank 77 has a link assembly comprising short link 78 and long link 79 affixed together and pinned to crank 77 at 81. This pair of connecting links 78 and 79 is affixed together by cross members such as 82 and 83 (FIG. 4) and is pinned to a driven crank 84 mounted to a driven crankshaft 86 supported in bearing assemblies contained in housing 87 and 88 (FIG. 4) secured respectively to the crank frame sides 89 and 91 which are part of a crank frame including bottom plate 90A, cross brace 90B, and back plate 90C, with side 89 and back plate 90C secured to the left side 56 and rear cross member 58 respectively of the ram housing. As shown in FIG. 3, another bracket 92 is mounted to the top of ram frame 11 and it has a pair of connecting links 93 pinned thereto and pinned to the driven crank 84. Therefore, as either of the ram drive cylinders 68 or 69 rotates the crankshaft in the direction of arrow 72, the connecting links 73, 74, and 93 drive the ram downward in the direction of arrow 94. Conversely, retracting of the piston rod in either of the cylinders 68 or 69 will lift the ram frame.

To prevent the ram from creeping downward in the absence of hydraulic pressure, a ram lock arrangement is provided. This includes an actuator rod 96 (FIG. 4) having a shear pin mount 97 secured thereto by a lock pin 98. This shear pin mount is received in a guide cylinder 99 and has a shear pin end 101 connected thereto by means of the shear pin 102 which is a part of or secured to the shear pin mount 97. The shear pin end 101 is received in the aperture 103 in the rear end of the long connecting link 79 as the ram lock actuator spring 104 seated on the crank frame wall 106 bears against the shoulder of the shear pin mount 97 urging it to the left in the direction of arrow 107. A ram release cylinder 108 mounted to the crank frame wall 106 has its piston connected to the actuator rod and is capable of driving the pin to the right against the load of the spring 104 when hydraulic pressure is applied in the cylinder 108. It thus removes the shear pin end from the locking aperture 103 in the long connecting link 79 and enables the ram drive cylinders 68 and 69 to operate the ram. A limit switch 109 senses the position of the actuator rod, and a rotary limit switch 111 senses the rotational position of the driven crank shaft.

As is best shown in FIG. 3, the upper side blade 37U is affixed to the ram frame 11 by a plurality of horizontally spaced socket head bolts 112. The upper front blade is secured to the ram frame in the same way, and the corner blocks may be secured in the same way, or by screws threadedly received in the ram frame itself rather than having nuts on the other ends thereof.

The lower side blade is secured to the ram housing side 56 by bolts in the same way and the nuts received on the outer ends thereof are apparent at 113 in FIG. 1. The lower front blade 36L is secured to the lower front 114 of the ram housing, in the same way as shown in FIG. 3.

Further as shown in FIG. 3, the pressure pad 116 of the hold down assembly is directly above the top surface of the lower blade 36L behind the relief groove 117 in the blade. Thus it is disposed to clamp the sheet stock or plate stock 118 directly between it and the upper edge of the blade, 36L. This pressure pad is secured by dowel pin 119 to guide pin 121 received in bushing 122. It is drivable downwardly by hydraulic cylinder 123. This cylinder is affixed to bracket 124 which is, in turn, affixed to plate 126 whose upper edge 128 abuttingly engages the lower edge 127 of the upper front wall 60 of the ram housing. Plate 126 is affixed to the front cover plate 12 of the hold-down frame, which is bolted to the upper front wall 60 of the ram housing.

Figure 12:
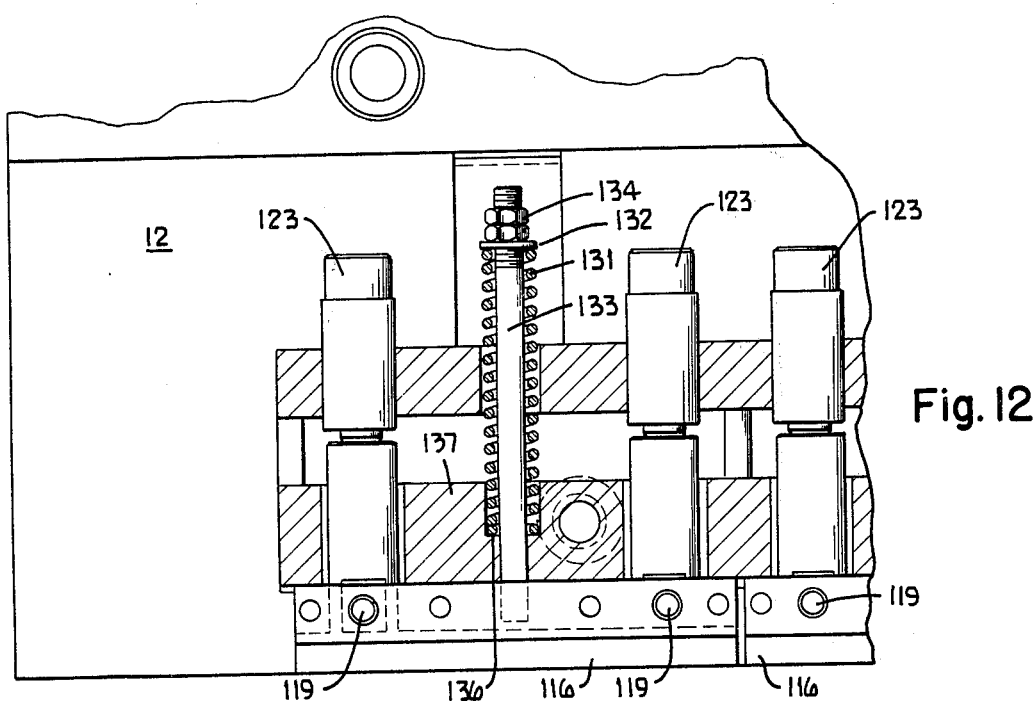
FIG. 12 is a section taken at line 12—12 in FIG. 10 and showing a portion of the hold-down system.

FIG. 12 shows one hold-down or clamp unit (and part of another) at the opposite (right-hand) end of the front cover plate 12. It illustrates that each end of a hold-down pressure pad 116 is connected to a guide pin in the same manner as shown in FIG. 3. For each hold-down pad, there is a return spring 131 received under washer 132 retained on the stud 133 by the nuts 134. The lower end of the stud is pinned to the hold-down and the lower end of the spring is seated on the bottom 136 of the counterbore in the guide pin bushing mounting bracket 137 affixed to the front frame cover plate 12. Accordingly, in the absence of pressure in the hold-down cylinders, the spring for each pressure pad returns the pad to a position of engagement of the upper face 138 of the pressure pad with the lower face of the guide bushing mounting bracket 137. There are eight such hold-down assemblies along the front of the machine behind the front frame cover plate 12 and six of them along the side of the machine behind the side frame cover plate 13.

Referring now to FIGS. 7 through 10, details of the blade clearance adjusting means will be described. The wedges described above with reference to FIG. 5 are shown in their actual form in FIGS. 8 and 9. Of course these are for the right front corner and serve to provide the guideway for the front guide block 33 of the ram. The wedge 41 is disposed between the face 141 of a plate 142 of the guideway housing, this plate being affixed to the right side 57. The tapered face of wedge 41 engages the tapered face of wedge 43, the latter being confined vertically between the way cap 143 at its upper end and the top surface 144 of the bottom plate 146 of the guideway housing, the latter being affixed with respect to the plate 142 thereof and the rear plate 147 thereof.

A wedge screw 148 is threadedly received in the wedge nut 149 received in a cavity in the wedge 41 and prevented from rotation in the cavity whereby the wedge can be driven downwardly and upwardly upon rotation of the wedge screw 148. The wedge screw shaft passes upwardly through the gear box 151 secured to the front gear box mounting plate 152 which is secured to the front guideway housing. This gear box includes a gear keyed to the wedge screw shaft and driven by a worm on a shaft to which the U-joint assembly 153 is connected. Similarly, a gear box assembly 154 is mounted to the front gear box mounting plate to drive the wedge screw shaft 156 having the screw thread thereon threadedly receiving the nut 157 confined in a cavity in the wedge 47. Wedge 47 has a vertically extending slot 158 therein receiving a screw 159. This is the same kind of screw as shown at 161 having a spring around it at 162 bearing on a seat 163 of a bore in the wedge 43, the threaded end of the screw being secured in the plate 142 and passing through a vertically extending slot 164 in the moveable wedge 41 which is like slot 158 of movable wedge 47. The purpose of the screw 161 is to retain the spring which urges the wedge 43 in the direction of arrow 166 against wedge 41. The same effect is provided as to wedge 49 by a spring around screw 159 urging wedge 49 against wedge 47. The wedge 49 is confined in the same way as is wedge 43 so that it does not move vertically while wedge 47 is moved vertically.

Figure 10:
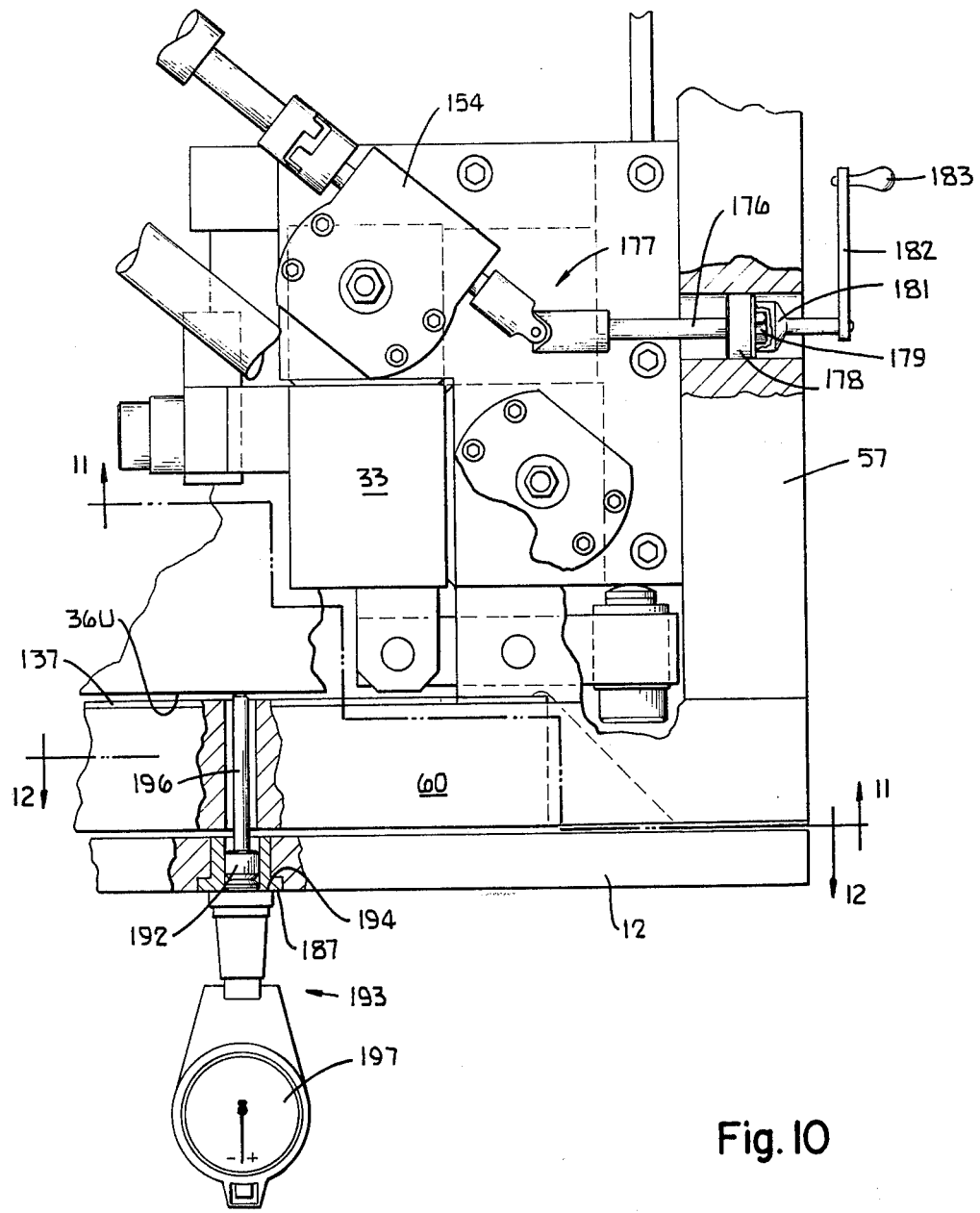
FIG. 10 is a still further enlarged top plan view of the right front corner portion of the view of FIG. 7 and including a portion of the ram assembly, particularly the front guide block thereof.

At the left rear of the ram assembly there is another guide housing fixed with respect to the left side 56 and the center support 59 and having a rear gear box mounting plate 167 secured to the top of it. The gear box assembly 168 is connected to the screw shaft for movable wedge 46 (FIG. 5), and gear box assembly 169 is connected to the screw shaft for wedge 39. To provide simultaneous and equal amounts of movement of the movable wedges to reduce the clearance between the front blades, a rear adjuster shaft 171 is connected through suitable couplings 172 to the worm shafts of the gear boxes 154 and 168. Similarly to provide simultaneous and equal movement of the wedges to change the clearance between the side blades a front adjuster shaft 173 is connected between the worm shafts of the gear boxes 151 and 169. As is best shown in FIG. 10, for the gear box 154 there is an extension shaft 176 from the universal joint assembly 177 connected to the worm shaft of the gear box. The extension shaft is carried in a support collar 178 received in an aperture in the side wall 57 and the extension shaft has a wrench adapter nut 179 affixed to the outer end thereof. This receives a matching socket of an adjusting wrench which, in the illustrated example, is the socket 181 connected to a crank 182 having a handle knob 183 thereon. Rotation of this crank by manual effort serves to simultaneously operate wedges 47 and 46. The same kind of extension shaft construction is provided at the universal joint 184 for gearbox 168 and at the universal joint 153 for gearbox 151 (FIG. 7), and at the universal joint 186 for gearbox 169. The adjuster shafts synchronize operation of gearboxes, which provides a choice of two locations for adjusting side blade clearance, and two locations for adjusting front blade clearance. Use of a wrench at either location will provide uniform horizontal movement of both ends of the blade involved, and will provide a clearance change that is uniform throughout the length of the respective blade. The swivel bearings at the rocker arm to link, link to ram, and cylinder to rocker arm, connections, avoid binding regardless of blade clearance adjustment.

For purposes of gauging, for the front blade clearance there are two gauge bushings 187 and 188 in the front hold-down frame plate 12 (FIG. 1), adjacent opposite ends of the upper front blade, and two gauge bushings 189 and 191 in the cover plate 13 of the side hold-down assembly, adjacent opposite ends of the upper side blade. Each of these bushings is identical to the others, and a description of one should suffice for all. Referring again to FIG. 10, bushing 187 is received in plate 12 and secured in place by a set screw or other suitable means. It fittingly receives the adaptor plug 192 of a gauge unit 193 having a flange 194 locating against the outer face of the bushing 187. The gauge unit includes a pin 196 whose inner end is engageable with the front face of the upper front blade 36U. The gauge unit includes a dial indicator 197 mounted therein for operation by the pin 196. The height of the bushing in the front frame 12 is such that the pin on the gauge unit remains in contact with the front face of the upper front blade from the ram up condition to the ram down condition.

Figure 9:
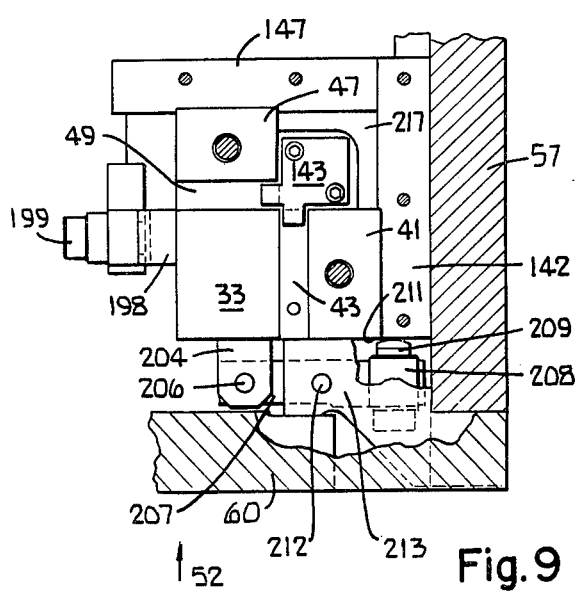
FIG. 9 is a section taken at line 9—9 in FIG. 8 and viewed in the direction of the arrows.
Figure 8:
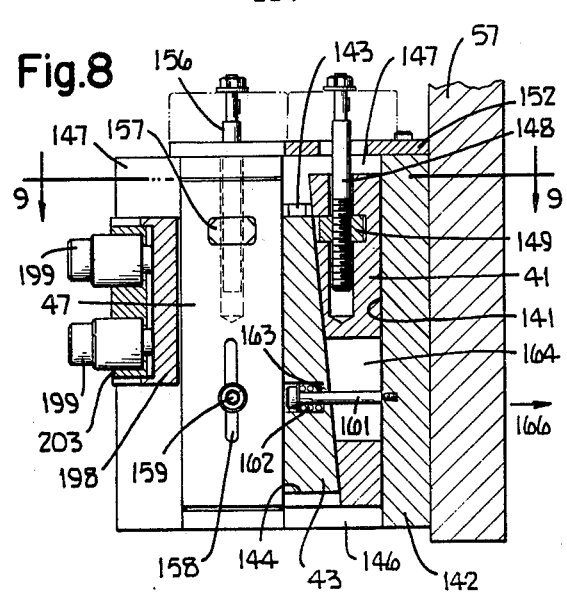
FIG. 8 is a much enlarged section through the adjustment assembly taken at line 8—8 in FIG. 7 and viewed in the direction of the arrows.

It was mentioned above that means are provided according to this invention whereby zero clearance is maintained between the ram guide slide blocks and the guideways provided by the fixed wedges. For this purpose and as best shown in FIGS. 8 and 9, on the left-hand side of the front guide slide block 33 there is a way take-up block 198 having its right hand face engaging the left hand face of the slide block 33. This way take-up block is urged to the right in the direction of arrow 166 by a pair of hydraulic cylinders 199. This same arrangement is provided on the left-hand side of the side guide block 34 by means of take-up block 200 and operating cylinders 210 therefor in FIG. 7. The same kind of arrangement is provided on the front face of the side guide block 34 by means of the way take-up block 201 and operating cylinders 202 therefor. It should be mentioned with reference again to FIG. 8 that the cylinders 199 are affixed to a cylinder mounting block 203 affixed to upstanding plate 147.

Figure 11:
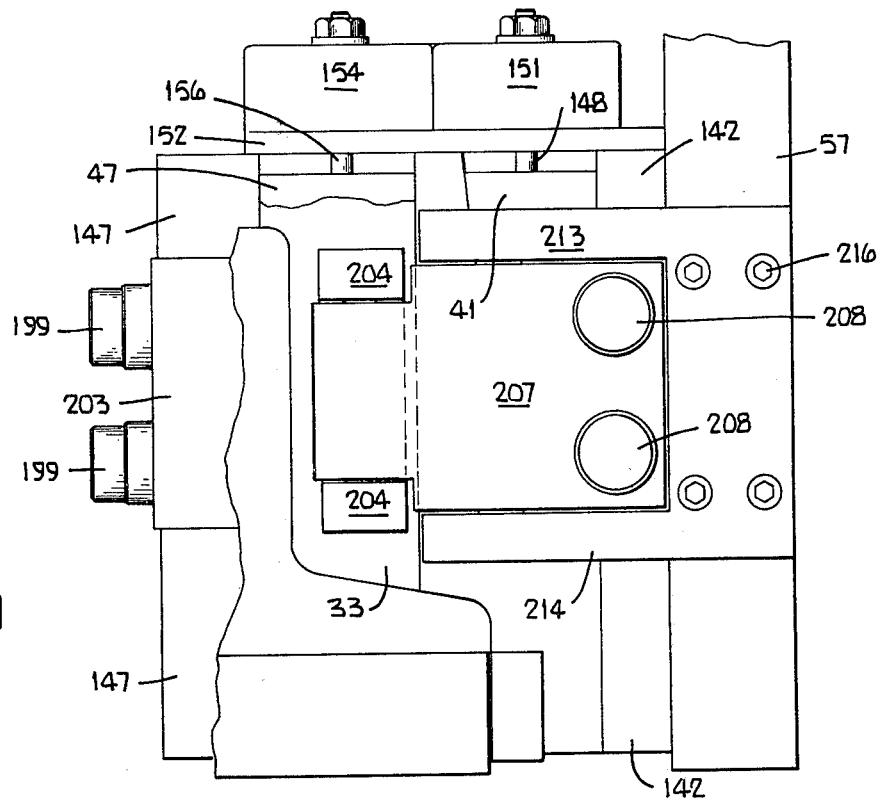
FIG. 11 is an elevation of the structure shown in FIG. 10 behind the line 11—11 in FIG. 10 and viewed in the direction of the arrows.

Take-up force in the direction of arrow 52 against the front face of the front guide slide block 33 is applied by means of a pivoting way block 204 pivotally mounted at pin 206 to a pivoting way plate or lever 207 having a hydraulic cylinder 208 affixed to the opposite end thereof and having a pressure pad 209 on the piston thereof bearing against the end face 211 of the guideway housing plate 142. The pivoting way plate is connected by a pivot pin 212 to the upper and lower arms 213 and 214, respectively (better shown in FIG. 11), of the pivoting way clevis which is affixed to an end face of the right side 57 by four screws 216. This construction is employed at this particular corner location to conserve space and accommodate the hold-down assembly which is disposed immediately in front of it.

Thus it can be seen that the present invention enables maintenance of zero clearance between the guide slides and guide wedges, and thereby maintain a desired blade clearance constantly under all conditions. One might say that as the two upper blades are moved vertically in their respective perpendicular planes for closure with their counterpart blades affixed to the base, for shearing material, a hydraulic balance of guide separating forces is achieved by gib pressure hydraulically applied through the take-up blocks (or gib pressure pads). Each such block may exert a force depending on the size of the associated cylinders, and pressure therein, and it is believed that between 2000 and 4000 pounds force for each block should suffice for most operating conditions.

Figure 13:
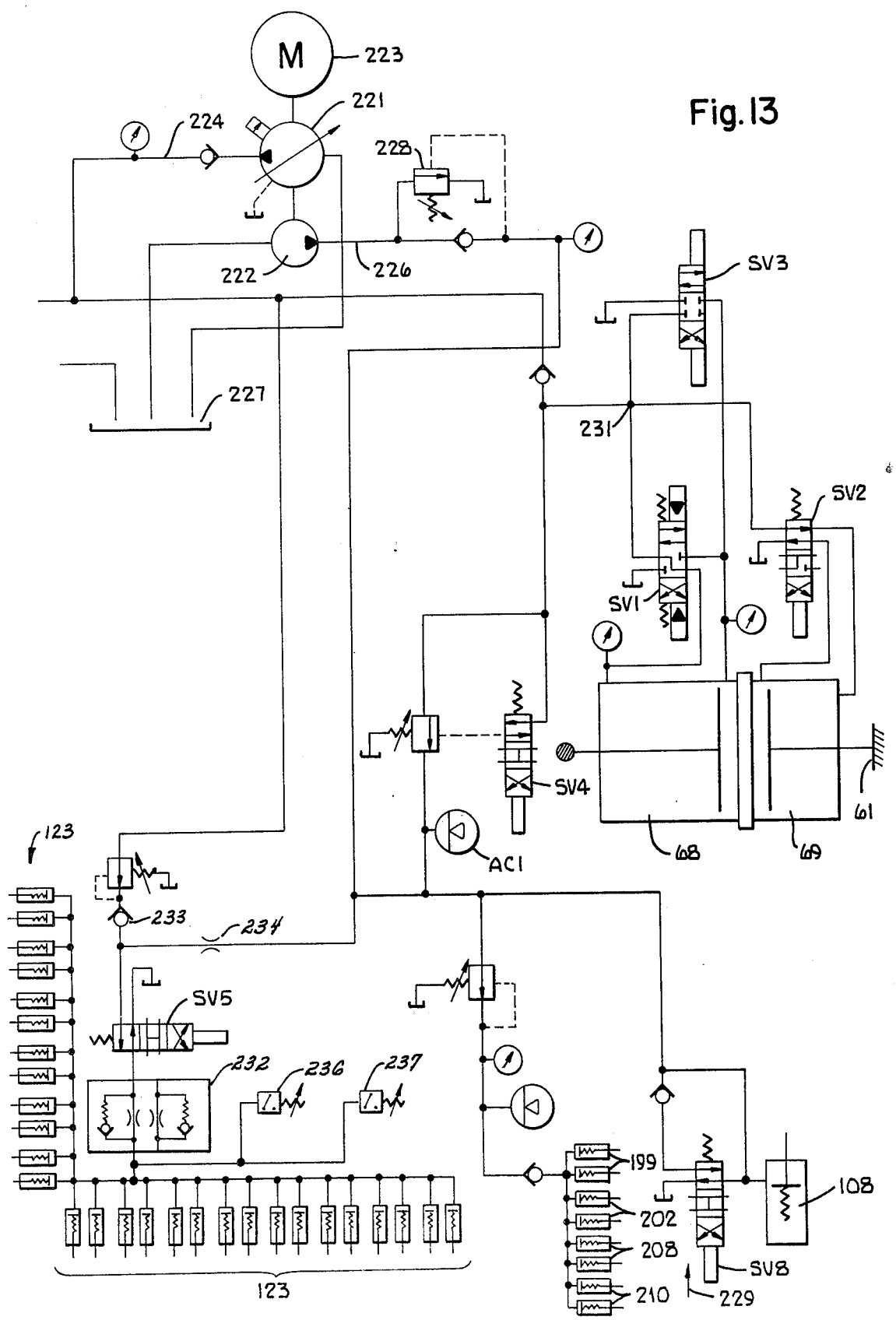
FIG. 13 is a hydraulic schematic diagram.

Referring now to FIG. 13, the ram drive cylinders 68 and 69 are shown in a back-to-back arrangement with hydraulic lines connected to chambers on both sides of the pistons on each. Cylinder 68 has a stroke twice that of cylinder 69 and the strokes are two and one half inch and one and one quarter inch, respectively. The purpose of the short stroke or half stroke cylinder 69 is to drive the ram approximately one and one quarter inch for shearing only with the front blade, considering the rake from the right hand corner of the front blade to the left hand end thereof. The full stroke cylinder is used for a complete two and one half inch stroke of the ram for shearing with both the front and side blades. The shearing with the front blade alone is used for a slitting operation as described in the aforementioned patent application.

The take-up cylinders are shown at 199, 202, 208, and 210. The ram lock release cylinder is shown at 108. The hold-down cylinders are also shown at 123.

Hydraulic supply for the system is provided by pumps 221 and 222 driven by motor 223. By way of example, pump 221 provides an output on line 224 at one thousand pounds per square inch. Pump 222 provides an output on line 226 at two thousand pounds per square inch. An adjustable unloading valve to return to sump 227 is provided at 228.

By following the hydraulic connections, it will be seen that the take-up cylinders are provided with hydraulic fluid from pump 222 at two thousand pounds per square inch. This pressure is established whenever the pump motor 223 is running. Also it will be noted that pressure from the high pressure pump 222 will be applied to the ram lock release cylinder 108 whenever the pump cylinder is running, and solenoid valve SV8 is energized shifting it in the direction of arrow 229 against its return spring. It might also be noted that this particular solenoid valve will by-pass the high pressure line to the sump when the valve is in the position shown and only when it is shifted by energization to block the return to the sump, will it be possible to activate the ram lock release cylinder and the take-up cylinders.

The pressure line 224 from the low pressure pump 221 is connected to the junction 231 from which it is delivered through the half stroke cylinder control valve SV2 to the rod end of the half stroke cylinder 69. It is also delivered through the full stroke cylinder control valve SV1 to the rod end of the full stroke cylinder 68. When it is desired to operate the half stroke cylinder, valve SV2 is shifted by the solenoid thereof to deliver hydraulic fluid from junction 231 to the head end of the piston in cylinder 69, venting the rod end to sump 227. Thus a pressure up to 1000 pounds per square inch would be applied to the piston to drive the ram downwardly. If the thickness of the material or other conditions required an increase in pressure, solenoid valve SV4 can be energized to apply pressure from line 226 established in accumulator AC1 through valve SV4 to the junction 231 and thence to the head end of cylinder 69. The same type of operation can be effected for the full stroke cylinder 68 but it is not intended that both cylinder piston rods be extended at the same time.

FIG. 13 also shows the eight pairs of hold-down cylinders 123 for the eight hold-down pressure pads above the front lower blade 36L, and the six pairs for the six hold-down pressure pads above the side lower blade 37L. Pressure is to these through solenoid valve SV5, when energized, and flow controller 232. The needed volume is obtained from pump 221 through check valve 233, and maximum pressure, upon clamping, is achieved from pump 222 through flow control orifice 234. Pressure levels in these cylinders are sensed by pressure operated switches 236 and 237 for electrical control functions not a part of this invention.

OPERATION

In setting up the machine for the desired blade clearance, the procedure to be followed may begin with the ram up and the movable wedges fully up. With new blades in the machine, this should provide a blade clearance of approximately 0.060 inches. Then the ram is jogged downwardly by momentarily shifting the valve SV3 until the upper and lower blades have closed sufficiently with each other to be in registry, both at the front and at the side. Although the rake of the upper blades has been described above, and is shown in an exaggerated form in FIG. 6, the overall height of each blade being approximately three inches is sufficient that it is possible to establish registry or a face-to-face relation between at least a portion of the upper and lower front blades and upper and lower side blades throughout the length of each. Then shim stock of known thickness can be placed between the facing surfaces of the upper and lower blades, then the hand cranks for the wedge drive gear boxes are turned to the extent required to move the ram in the direction necessary to close up the clearance until there is a drag established on the shim stock. This may be done first with the wedges adjusting the side blade clearance, or first with the wedges adjusting the front blade clearance.

If the machine is so well constructed that with the wedges fully up, the clearance is exactly the same at one end of the blade as at the other before adjustment of the wedges, then the adjuster shaft associated with the wedges for adjusting those blades can be connected initially. For example, if it is the front blades which are in perfect spacing throughout their length, then the adjusting shaft 171 can be connected before the above described desired clearance adjustment is made. In this way, the cranking at the right-hand side by use of a wrench or crank on the adaptor 179 will serve to simultaneously establish the desired clearance throughout the length of the front blades. On the other hand, if the blades are not of precisely the same clearance at both ends when the wedges are fully up, then, with the adjuster shaft 171 out, the necessary adjustment can be made at gear box 154 and gear box 168 by using the hand crank separately on the extension shafts for the respective gear boxes, prior to installation of the synchronizing adjuster shaft 171. The same can be done for the side blade. It may be found more convenient to use the crank at the left hand side of the machine for adjusting the side blades, than at the right hand side.

The gear ratio in the gear boxes is such that, combined with the ramp of the wedges, it requires approximately ten turns of a crank on the extension shaft to achieve a blade clearance change of approximately 0.0010 inches. It is believed that for thicknesses of 0.080 or less hot or cold rolled mild steel, a front and side blade clearance of approximately .0050 inches with new blades will give satisfactory blade life.

The maintenance of high pressure and therefore high forces on the guide slide blocks of the ram, establishing zero clearance between them and the gib wedges against which they slide, assures that the desired blade clearance will be maintained at all times. Also the very moderate slope of the wedges assures that the gib will not move out of place, and it is preferable that when adjusting the wedges, the adjustment be terminated as the wedges are being driven downward, rather than as they are coming up, in order to avoid the possibility of change of adjustment due to tolerances in screw threads, nuts, gears and the like.

It has previously been mentioned that there are four bushings provided which may be used for mounting a dial indicator. Once a known blade clearance has been established by use of the shim stocks as described above, the dial indicator located in the bushing associated with that blade can be noted for a reading thereon. This reading can then be used as a reference for blade clearance changes without the necessity of again using the shim stock technique. The employment of bushings near both ends of each of the blades facilitates verification of uniformity of change of blade clearance at both ends. While it is believed that the blade clearance of the front and side blades is likely to be the same, it is possible that where the bulk of the work will be done with the front blades, or that for other reasons, depending upon the nature of the work done and the size of the cuts made and the materials being cut, a different clearance may be employed between the front blades than that employed between the side blades. Although perhaps it is unnecessary to mention, the dial indicator gauge would not remain installed during operation of the shearing machine on the work to be sheared.

While the invention has been illustrated and described in detail in the drawings and foregoing description, the same is to be considered as illustrative and not restrictive in character. For example, while the present disclosure affixes the lower blades to a fixed base in the form of the lower front and left side wall of a ram and conveyor housing, it is conceivable that aspects of the present invention could be practiced where lower blades are adjustable for clearance, and/or drivable for shearing operations, and that front and side blades might be separately drivable for shearing operations. Also it might be considered desirable that, in lieu of the shim stock technique, the blades in registry be moved into face-to-face abutment, the dial indicator or indicators set at a reference mark designating zero blade clearance, and then the wedges backed out to provide a dial indicator reading representing the desired blade clearance. Therefore it should be understood that only the preferred embodiment has been shown and described and that all changes and modifications that come within the spirit of the invention are desired to be protected.

I claim:

1. A method of shearing metal or other materials in sheet form using power-driven shears and comprising the steps of:
   introducing the sheet to be sheared into the space between the blades of a pair of shears;
   moving one blade of said pair of shears in a first plane for closure thereof with another blade of a pair along a first line to shear said sheet along said line;
   moving said one blade in said plane and away from said another blade after shearing said sheet along said line; and
   applying force to said one blade in a direction perpendicular to said first plane by application of fluid pressure to said one blade to hold said one blade against guide means during said closure during movement of said one blade away from said another blade, said force being applied in a direction tending to increase side clearance between said blades;
   moving one blade of a second pair of shears in a second plane for closure thereof with another blade of the second pair on a second line intersecting said first line to shear said sheet along said second line;
   moving the one blade of the second pair in said second plane and away from said another blade of the second pair after shearing said sheet along said second line;
   and applying force to said one blade of said second pair in a direction perpendicular to said second plane by application of fluid pressure to said one blade of said second pair to hold said one blade of the second pair against guide means during closure and during movement of said one blade of said second pair away from said another blade of said second pair.

2. A method of shearing metal or other materials in sheet form using power driven shears and comprising the steps of:
   introducing the sheet to be sheared into the space between the blades of a pair of shears;
   moving one blade of said pair of shears in a first plane for closure thereof with another blade of a pair along a first line to shear said sheet along said line;

applying force to said one blade in a direction perpendicular to said first plane by application of fluid pressure to said one blade to hold said one blade against guide means during said closure;
applying said force in a direction tending to increase side clearance between said blades;
moving one blade of a second pair of shears in a second plane for closure thereof with another blade of the second pair on a second line intersecting said first line to shear said sheet along said second line;
and applying force to said one blade of said second pair in a direction perpendicular to said second plane by application of fluid pressure to said one blade of said second pair to hold said one blade of the second pair against guide means during closure;
adjusting said guide means to provide a known clearance between cutting edges of said blades when closed;
registering on a gauge the position of a movable one of said blades when said clearance is established; and
further adjusting at least one of said guide means while registering on said gauge a change of position of said movable one of said blades effected by further adjusting said one guide means to provide the clearance desired between the cutting edges when closed and while said pressure is applied.

3. A method of shearing metal or other materials in sheet form using power driven shears and comprising the steps of:

introducing the sheet to be sheared into the space between the blades of a pair of shears;
moving one blade of said pair of shears in a first plane for closure thereof with another blade of a pair along a first line to shear said sheet along said line;
applying force to said one blade in a direction perpendicular to said first plane by application of fluid pressure to said one blade to hold said one blade against guide means during said closure;
applying said force in a direction tending to increase side clearance between said blades;
moving one blade of a second pair of shears in a second plane for closure thereof with another blade of the second pair on a second line intersecting said first line to shear said sheet along said second line;
applying force to said one blade of said second pair in a direction perpendicular to said second plane by application of fluid pressure to said one blade of said second pair to hold said one blade of the second pair against guide means during closure;
adjusting said guide means to provide contact between cutting edges of said blades of said first pair when closed, and contact between cutting edges of said blades of said second pair when closed;
registering on a gauge the positions of said movable blades of said pairs when in contact;
and then adjusting said guide means to provide the clearance desired between cutting edges of said first pair when closed and to provide the clearance desired between the cutting edges of said second pair when closed.

* * * * *